United States Patent
Fu et al.

(10) Patent No.: US 10,659,847 B2
(45) Date of Patent: May 19, 2020

(54) FRAME DROPPING METHOD FOR VIDEO FRAME AND VIDEO SENDING APPARATUS

(71) Applicant: Huawei Technologies Co., Ltd., Shenzhen (CN)

(72) Inventors: Yang Fu, Shenzhen (CN); Tizheng Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/678,846

(22) Filed: Aug. 16, 2017

(65) Prior Publication Data

US 2017/0347158 A1    Nov. 30, 2017

Related U.S. Application Data

(63) Continuation of application No. PCT/CN2015/083667, filed on Jul. 9, 2015.

(30) Foreign Application Priority Data

Feb. 17, 2015   (CN) .......................... 2015 1 0091898

(51) Int. Cl.
*H04N 21/647* (2011.01)
*H04N 21/234* (2011.01)
(Continued)

(52) U.S. Cl.
CPC ..... *H04N 21/64769* (2013.01); *H04N 19/114* (2014.11); *H04N 19/132* (2014.11);
(Continued)

(58) Field of Classification Search
CPC .. H04N 19/114; H04N 19/132; H04N 19/152; H04N 19/177; H04N 21/23406;
(Continued)

(56) References Cited

U.S. PATENT DOCUMENTS 9,218,848 B1 *  12/2015  Waggoner .......... G11B 27/3036
2003/0091000 A1   5/2003  Chu et al.
(Continued)

FOREIGN PATENT DOCUMENTS

CN     101272486 A    9/2008
CN     101527834 A    9/2009
(Continued)

OTHER PUBLICATIONS

Machine Translation and Abstract of Chinese Publication No. CN101527834, Sep. 9, 2009, 8 pages.
Machine Translation and Abstract of Chinese Publication No. CN103533356, Jan. 22, 2014, 16 pages.
Machine Translation and Abstract of Chinese Publication No. CN104135486, Nov. 5, 2014, 10 pages.
(Continued)

*Primary Examiner* — Rong Le
(74) *Attorney, Agent, or Firm* — Conley Rose, P.C.

(57) ABSTRACT

A frame dropping method for a video frame and a video sending apparatus are used to perform frame dropping processing on video frames in order to reduce a quantity of dropped frames, enhance video playing smoothness, and improve user experience. A specific solution includes obtaining a video frame sequence of a to-be-sent video, establishing a reference relationship between video frames in the video frame sequence according to a preset criterion, and detecting a data occupation length of buffered video frames in a video sending buffer during a process of sending the video frame sequence, dropping a current to-be-buffered video frame when the data occupation length is greater than a preset threshold, and dropping all video frames in the video frame sequence that reference the current to-be-buffered video frame according to the reference relationship.

20 Claims, 3 Drawing Sheets

(51) Int. Cl.
*H04N 21/238* (2011.01)
*H04N 19/114* (2014.01)
*H04N 19/132* (2014.01)
*H04N 19/177* (2014.01)
*H04N 19/152* (2014.01)

(52) U.S. Cl.
CPC ......... *H04N 19/152* (2014.11); *H04N 19/177* (2014.11); *H04N 21/23406* (2013.01); *H04N 21/23805* (2013.01); *H04N 21/64792* (2013.01)

(58) Field of Classification Search
CPC ....... H04N 21/23805; H04N 21/64769; H04N 21/64792
See application file for complete search history.

(56) References Cited

U.S. PATENT DOCUMENTS

| | | | |
|---|---|---|---|
| 2007/0296854 A1* | 12/2007 | Berkey | H04N 19/172 348/412.1 |
| 2008/0192830 A1* | 8/2008 | Ahn | H04N 19/172 375/240.21 |
| 2010/0086280 A1 | 4/2010 | Sabo | |
| 2010/0168885 A1 | 7/2010 | Li et al. | |
| 2011/0252155 A1 | 10/2011 | Parekh et al. | |
| 2012/0008499 A1 | 1/2012 | Stanwood et al. | |
| 2012/0121014 A1* | 5/2012 | Rusert | H04N 21/4385 375/240.12 |
| 2012/0151540 A1 | 6/2012 | Stanwood et al. | |
| 2013/0058406 A1 | 3/2013 | Ye et al. | |
| 2013/0308461 A1 | 11/2013 | Stanwood et al. | |
| 2014/0002742 A1* | 1/2014 | Chamaret | G06T 3/0012 348/571 |
| 2014/0132837 A1 | 5/2014 | Ye et al. | |

FOREIGN PATENT DOCUMENTS

| | | |
|---|---|---|
| CN | 102405626 A | 4/2012 |
| CN | 103124348 A | 5/2013 |
| CN | 103270728 A | 8/2013 |
| CN | 103533356 A | 1/2014 |
| CN | 104135486 A | 11/2014 |
| CN | 104702968 A | 6/2015 |
| EP | 2574010 A2 | 3/2013 |

OTHER PUBLICATIONS

Machine Translation and Abstract of Chinese Publication No. CN104702968, Jun. 10, 2015, 27 pages.
Foreign Communication From a Counterpart Application, European Application No. 15882362.5, Extended European Search Report dated Nov. 8, 2017, 8 pages.
Foreign Communication From a Counterpart Application Chinese Application No. 201510091898.2, Chinese Office Action dated May 18, 2017, 7 pages.
Foreign Communication From a Counterpart Application, PCT Application No. PCT/CN2015/083667, English Translation of International Search Report dated Aug. 26, 2015, 2 pages.
Foreign Communication From a Counterpart Application, PCT Application No. PCT/CN2015/083667, English Translation of Written Opinion dated Aug. 26, 2015, 8 pages.
Machine Translation and Abstract of Chinese Publication No. CN101272486, Sep. 24, 2008, 9 pages.
Foreign Communication From a Counterpart Application, Chinese Application No. 201510091898.2, Chinese Office Action dated Aug. 23, 2018, 7 pages.
Foreign Communication From a Counterpart Application, European Application No. 15882362.5, European Oral Proceedings dated Apr. 8, 2019, 6 pages.
Machine Translation and Abstract of Chinese Publication No. CN101527834, Sep. 9, 2009, 8 pp.
Machine Translation and Abstract of Chinese Publication No. CN103533356, Jan. 22, 2014, 16 pp.
Machine Translation and Abstract of Chinese Publication No. CN104135486, Nov. 5, 2014, 10 pp.
Machine Translation and Abstract of Chinese Publication No. CN104702968, Jun. 10, 2015, 27 pp.
Foreign Communication From a Counterpart Application, European Application No_ 15882362.5, Extended European Search Report dated Nov. 8, 2017, 8 pp.
Foreign Communication From a Counterpart Application Chinese Application No. 201510091898.2, Chinese Office Action dated May 18, 2017, 7 pp.
Foreign Communication From a Counterpart Application, PCT Application No_ PCT/CN2015/083667, English Translation of International Search Report dated Aug. 26, 2015, 2 pp.
Foreign Communication From a Counterpart Application, PCT Application No. PCT/CN2015/083667, English Translation of Written Opinion dated Aug. 26, 2015, 8 pp.

* cited by examiner

FRAME DROPPING METHOD FOR VIDEO FRAME AND VIDEO SENDING APPARATUS

CROSS-REFERENCE TO RELATED APPLICATIONS

This application is a continuation of International Patent Application No. PCT/CN2015/083667 filed on Jul. 9, 2015, which claims priority to Chinese Patent Application No. 201510091898.2 filed on Feb. 17, 2015. The disclosures of the aforementioned applications are hereby incorporated by reference in their entireties.

TECHNICAL FIELD

The present disclosure relates to the communications field, and in particular, to a frame dropping method for a video frame and a video sending apparatus.

BACKGROUND

With popularity of the mobile Internet, there is a higher probability that an Internet Protocol (IP) camera (IPC) video is demanded on a mobile terminal apparatus such as a mobile phone. However, subject to impact of undesirable stability of wireless networks and insufficient bandwidth, an unclear video image or even a frozen video image is very likely to occur, and playing of a video is not smooth. Therefore, how to play a video smoothly on an unstable wireless network with limited bandwidth is an urgent issue needed to be resolved.

In other approaches, a to-be-sent video is encoded to generate a full frame rate bitstream. When a network environment is good, the full frame rate bitstream is sent, and a frame rate for video sending is decreased quickly by means of frame dropping to adapt to the actual network environment when the network environment is poor. Further, when a poor network environment causes buffer overflow, an entire segment of video frames between a last frame of the buffer and a next instantaneous decoding refresh (IDR) frame is all dropped. When the next IDR frame arrives, whether buffer overflow remains is determined. If the buffer has free space, the IDR frame is not dropped and a subsequent frame is sent, and the IDR frame is dropped until a still next IDR frame arrives if the buffer is still in an overflow state. Such frame dropping manner is dropping a continuous segment of video frames all at a time. A quantity of video frames dropped in one frame dropping operation is large. As a result, long-time freezing of an image occurs, and the freezing is even severer after the IDR frame is dropped, which causes poor user experience.

SUMMARY

Embodiments of the present disclosure provide a frame dropping method for a video frame and a video sending apparatus in order to reduce a quantity of dropped frames, enhance video playing smoothness, and improve user experience.

To achieve the foregoing objective, the following technical solutions are used in the embodiments of the present disclosure According to a first aspect, a frame dropping method for a video frame is provided, including obtaining a video frame sequence of a to-be-sent video, establishing a reference relationship between video frames in the video frame sequence according to a preset criterion, where the reference relationship includes that in the video frame sequence, the $m^{th}$ frame references the $(m-h)^{th}$ frame, and that in the video frame sequence, the $n^{th}$ frame is referenced by at least two video frames of video frames after the $n^{th}$ frame, where m, h, and n are all natural numbers, m is greater than 1 and m is greater than h, and a quantity of the video frames in the video frame sequence is not less than n+2, detecting a data occupation length of buffered video frames in a video sending buffer during a process of sending the video frame sequence, and dropping a current to-be-buffered video frame, and dropping all video frames in the video frame sequence that reference the current to-be-buffered video frame according to the reference relationship when the data occupation length is greater than a preset threshold.

With reference to the first aspect, in a first possible implementation manner, the preset criterion is a requirement on video playing smoothness, where in the reference relationship, a higher requirement on video playing smoothness indicates a larger quantity of video frames that directly reference an IDR frame, and the IDR frame is the first frame of the video frame sequence.

With reference to the first aspect, in a second possible implementation manner, the preset criterion is importance of each video frame in the video frame sequence, where in the reference relationship, a video frame of greater importance is directly referenced by a video frame of less great importance.

With reference to the first aspect, in a third possible implementation manner, the preset criterion is a benchmark sending rate of a network, where a higher benchmark sending rate of the network indicates more video frames in the reference relationship that directly reference an IDR frame, and the IDR frame is the first frame of the video frame sequence.

With reference to any one of the first aspect to the third possible implementation manner of the first aspect, in a fourth possible implementation manner, the reference relationship between the video frames in the video frame sequence includes video frames after the IDR frame all reference the IDR frame when the first frame of the video frame sequence is an IDR frame.

With reference to any one of the first aspect to the fourth possible implementation manner of the first aspect, in a fifth possible implementation manner, each video frame in the video frame sequence corresponds to one preset threshold of the sending buffer.

With reference to any one of the first aspect to the fifth possible implementation manner of the first aspect, in a sixth possible implementation manner, the method further includes storing the current to-be-buffered video frame in the sending buffer when the data occupation length is not greater than the preset threshold.

According to a second aspect, a video sending apparatus is provided, including an obtaining unit configured to obtain a video frame sequence of a to-be-sent video, an encoding unit configured to establish, according to a preset criterion, a reference relationship between video frames in the video frame sequence obtained by the obtaining unit, where the reference relationship includes that in the video frame sequence, the $m^{th}$ frame references the $(m-h)^{th}$ frame, and that in the video frame sequence, the $n^{th}$ frame is referenced by at least two video frames of video frames after the $n^{th}$ frame, where m, h, and n are all natural numbers, m is greater than 1 and m is greater than h, and a quantity of the video frames in the video frame sequence is not less than n+2, a detection unit configured to detect a data occupation length of buffered video frames in a video sending buffer during a process of sending the video frame sequence, and a frame dropping unit configured to drop a current to-be-buffered video frame, and drop all video frames in the video frame sequence that reference the current to-be-buffered video frame according to the reference relationship when the detection unit detects that the data occupation length is greater than a preset threshold.

With reference to the second aspect, in a first possible implementation manner, the preset criterion is a requirement on video playing smoothness, where the reference relationship, established by the encoding unit, between the video frames in the video frame sequence includes a higher requirement on video playing smoothness indicates a larger quantity of video frames that directly reference an IDR frame, and the IDR frame is the first frame of the video frame sequence.

With reference to the second aspect, in a second possible implementation manner, the preset criterion is importance of each video frame in the video frame sequence, where the reference relationship, established by the encoding unit, between the video frames in the video frame sequence includes a video frame of greater importance is directly referenced by a video frame of less great importance.

With reference to the second aspect, in a third possible implementation manner, the preset criterion is a benchmark sending rate of a network, where the reference relationship, established by the encoding unit, between the video frames in the video frame sequence includes a higher benchmark sending rate of the network indicates a larger quantity of video frames that directly reference an IDR frame.

With reference to any one of the second aspect to the third possible implementation manner of the second aspect, in a fourth possible implementation manner, the reference relationship between the video frames in the video frame sequence includes video frames after the IDR frame all reference the IDR frame when the first frame of the video frame sequence is an IDR frame.

With reference to any one of the second aspect to the fourth possible implementation manner of the second aspect, in a fifth possible implementation manner, each video frame in the video frame sequence corresponds to one preset threshold of the sending buffer.

With reference to any one of the second aspect to the fifth possible implementation manner of the second aspect, in a sixth possible implementation manner, the frame dropping unit is further configured to store the current to-be-buffered video frame in the sending buffer when the detection unit detects that the data occupation length is not greater than the preset threshold.

With the frame dropping method for a video frame and the video sending apparatus provided in the embodiments of the present disclosure, according to a preset criterion, a reference relationship between video frames in a video frame sequence is established and whether to perform frame dropping is further determined. In a process of sending the video frame sequence, when frame dropping is determined to be performed, a current to-be-buffered video frame is dropped, and all video frames in the video frame sequence that reference the current to-be-buffered video frame according to the reference relationship are dropped. In the video frame sequence, the $n^{th}$ frame is referenced by at least two video frames of video frames after the $n^{th}$ frame. For one video frame that references the $n^{th}$ frame, when the video frame is determined to be dropped, other video frames that reference the $n^{th}$ frame may still be retained, without a need to perform frame dropping until an IDR frame arrives. Thereby, a quantity of video frames dropped in one frame dropping operation is reduced, and long-time freezing of an image is avoided. In addition, after one frame dropping operation is completed, if a network environment gets better, the retained video frames may be sent at a relatively high frame rate. Thereby, a frame rate for video sending can be reduced or increased according to a change in the network environment in order to reduce a quantity of dropped video frames, and improve video playing smoothness.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The embodiments of the present disclosure provide a frame dropping method for a video frame, and the method may be applied to an application scenario of network transmission of a live video, such as a video conference or IPC video on demand. The embodiments of the present disclosure are described using an application scenario of IPC video on demand as an example. Generally speaking, an IPC video on demand system includes a video sending apparatus and a video receiving apparatus. The video sending apparatus obtains a video frame sequence by means of video shooting, and after encoding the video frame sequence, sends an encoded video frame sequence to the video receiving apparatus using a network. Sending manners include broadband networks, 3rd-generation (3G) networks, 4th-generation (4G) networks, and the like. A changing network environment greatly affects video playing smoothness. The frame dropping method for a video frame provided in the embodiments of the present disclosure is used to improve video playing smoothness when a video is demanded on a network in a changing network environment.

A video frame obtained after being encoded by the video sending apparatus may be a key frame or a non-key frame. The key frame records a complete frame of video image. If a video frame is a key frame, a video playing apparatus may obtain a complete video image by decoding the video frame. The non-key frame records a part that is different between one frame of video and another frame of video. If a video frame is a non-key frame, the video playing apparatus needs to decode the video frame based on a reference frame of the video frame to obtain a complete video image. A non-key frame may reference a key frame, or may reference another non-key frame. For a non-key frame, if its reference frame is lost, even if the video receiving apparatus receives the video frame, when the frame is played, artifacts or pixilation may still appear.

The embodiments of the present disclosure provide descriptions using an example in which a key frame is used as an IDR frame, and a non-key as a forward-predicted frame, that is, a P frame. Certainly, it does not mean that the frame dropping method provided in the embodiments of the present disclosure may be applicable to only this case. A person skilled in the art may understand that, both the key frame and the non-key frame may have more than one specific implementation manner.

Figure 1:
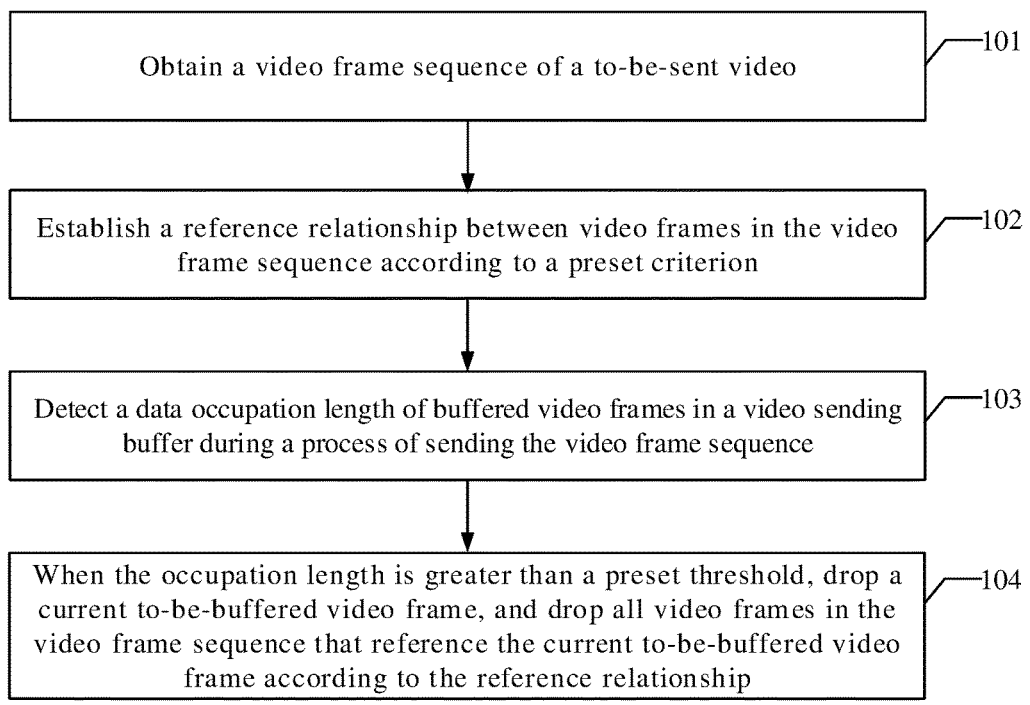
FIG. 1 is a schematic flowchart of a frame dropping method for a video frame according to an embodiment of the present disclosure.

Referring to FIG. 1, a frame dropping method provided in an embodiment of the present disclosure includes the following steps.

Step 101: Obtain a video frame sequence of a to-be-sent video.

Step 102: Establish a reference relationship between video frames in the video frame sequence according to a preset criterion, where the reference relationship includes that in the video frame sequence, the $m^{th}$ frame references the $(m-h)^{th}$ frame, and that in the video frame sequence, the $n^{th}$ frame is referenced by at least two video frames of video frames after the $n^{th}$ frame, where m, h, and n are all natural numbers, m is greater than 1 and m is greater than h, and a quantity of the video frames in the video frame sequence is not less than n+2.

Step 103: Detect a data occupation length of buffered video frames in a video sending buffer during a process of sending the video frame sequence.

Step 104: When the data occupation length is greater than a preset threshold, drop a current to-be-buffered video frame, and drop all video frames in the video frame sequence that reference the current to-be-buffered video frame according to the reference relationship.

Step 101 to step 104 are further described as follows.

Step 101: Obtain a video frame sequence of a to-be-sent video.

In an application scenario of IPC video on demand, when a video receiving apparatus demands a video using a network, the video demanded is a to-be-sent video. A video sending apparatus sends the to-be-sent video to the video receiving apparatus using the network, and the to-be-sent video is played by the video receiving apparatus.

The to-be-sent video includes several consecutive video frames, and each video frame corresponds to one frame of image of the video. The video sending apparatus sends a sequence formed by consecutive video frames to the video receiving apparatus.

The video frame sequence mentioned in this embodiment of the present disclosure does not refer to a sequence formed by all video frames of the to-be-sent video, but refer to a sequence segment including a known quantity of video frames. The first frame of the video frame sequence is an IDR frame, and non-IDR video frames in the video frame sequence are P frames.

For ease of description, the sequence formed by all the video frames of the to-be-sent video is referred to as an original video frame sequence. The original video frame sequence may include multiple video frame sequences. In this embodiment, the frame dropping method provided in the present disclosure is described with respect to a video frame sequence. During a process of sending the to-be-sent video, the frame dropping method may be cyclically applied to some or all video frame sequences included by the original video frame sequence.

The video sending apparatus may obtain the original video frame sequence by means of video shooting, and further obtain the video frame sequence of the to-be-sent video.

Step 102: Establish a reference relationship between video frames in the video frame sequence according to a preset criterion.

The video sending apparatus needs to encode each video frame in the video frame sequence, establish the reference relationship between the video frames in the video frame sequence, and send the video frame sequence to the video receiving apparatus.

In general, in comparison with a P frame, a data amount of a IDR frame is greater, and therefore, more network resources need to be occupied to send a key frame. Therefore, in an encoding process, the video sending apparatus may reduce a total data amount of video frame sequences by appropriately arranging a ratio of IDR frames to P frames. In addition, the reference relationship between the video frames in the video frame sequence is established and frame dropping is performed according to the reference relationship such that the video receiving apparatus can, when frame dropping occurs, recover a complete video frame according to an actually received video frame in order to ensure completeness of each frame of image when the video is played.

Figure 2A:
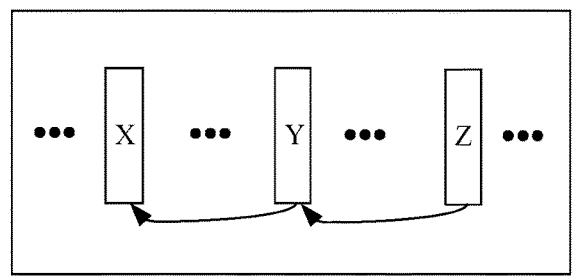
FIG. 2A is a schematic diagram of a reference relationship between video frames according to an embodiment of the present disclosure.

The reference relationship between the video frames is established in a manner that a video frame directly references or indirectly references another frame. With reference to FIG. 2A, the reference relationship is expressed using a curve with an arrow in FIG. 2A. A video frame at a start point of the curve references a video frame to which the arrow points. In the figure, a video frame X, a video frame Y, and a video frame Z are included. The video frame X is located before the video frame Y and the video frame Z, and the video frame Y is located before the video frame Z. Another video frame may exist before, after, or between the three video frames, which is not shown in the figure.

The video frame Z uses the video frame Y as a reference frame, that is, the video frame Z directly references the video frame Y. Likewise, the video frame Y uses the video frame X as a reference frame, that is, the video frame Y directly references the video frame X. In addition, although the video frame X is not a reference frame of the video frame Z, a reference frame of the video frame Z, that is, the video frame Y, uses the video frame X as a reference frame. If the video frame X is dropped, the reference frame of the video frame Z is dropped as a result. Consequently, the video receiving apparatus cannot obtain a complete frame of video image according to the video frame Z, that is, the video frame Z is considered to indirectly reference the video frame X.

For one video frame, when the frame is determined to be dropped, a video frame that directly references or indirectly references the video frame is dropped together, and the video receiving apparatus can, when playing the video, obtain a complete video image according to video frames not having been dropped.

Because a reference relationship between video frames has an immediate effect on a specific frame dropping manner, the specific frame dropping manner, including a quantity of frame dropping operations in a given network environment and a quantity of dropped video frames when frame dropping occurs, may be changed by changing the reference relationship.

In the frame dropping method for a video frame provided in this embodiment of the present disclosure, the reference relationship established for the video frames in the video frame sequence includes that in the video frame sequence, the $m^{th}$ frame references the $(m-h)^{th}$ frame, where if the $(m-h)^{th}$ frame is determined to be dropped, the $m^{th}$ frame is dropped together, and that in the video frame sequence, the $n^{th}$ frame is referenced by at least two video frames of video frames after the $n^{th}$ frame, where if the $n^{th}$ frame is determined to be dropped, video frames that reference the $n^{th}$ frame are dropped together, where m, h, and n are all natural numbers, m is greater than 1 and m is greater than h, and a quantity of the video frames in the video frame sequence is not less than n+2.

Optionally, the preset criterion mentioned in this embodiment may be a requirement on video playing smoothness. That is, establishing a reference relationship according to the preset criterion may be establishing the reference relationship between the video frames in the video frame sequence according to the requirement on video playing smoothness. A higher requirement on video playing smoothness indicates a larger quantity of video frames that directly reference an IDR frame, and whether to perform frame dropping is separately determined for the video frames that directly reference the IDR frame. For one video frame that directly references the IDR frame, if frame dropping is determined to be performed, that another video frame that directly references the IDR frame is also dropped is not caused.

Optionally, the preset criterion mentioned in this embodiment may alternatively be importance of each video frame in the video frame sequence. That is, establishing a reference relationship according to the preset criterion may be categorizing video frames in the video frame sequence according to different importance of the video frames in the video frame sequence, and establishing the reference relationship between the video frames in the video frame sequence according to different importance, where a video frame of greater importance is directly referenced by a video frame of less great importance. Thereby, that a video frame of greater importance is dropped because a video frame of less great importance is dropped is avoided. Further, importance levels of different video frames are determined according to degrees of interest shown by a user in some video frames in a video, or according to a specific need of the user. For example, the to-be-sent video is a surveillance video in a given scenario, such as a parking lot. In some periods of time, a quantity of vehicles or people that enter or leave a surveillance area is relatively small, and a video includes mostly images that are repeated or static. In this case, these video frames are video frames of less great importance. At the same time, video frames corresponding to video images that change continually are used as video frames of greater importance. After the reference relationship is established according to importance categorization, when frame dropping is performed, video frames of greater importance are not dropped or dropped as few as possible, while for video frames of less great importance, a quantity of frame dropping operations and a quantity of dropped video frames may be increased relatively.

Alternatively, the preset criterion mentioned in this embodiment may be a benchmark sending rate of a network. That is, establishing a reference relationship according to the preset criterion may be establishing the reference relationship between the video frames in the video frame sequence according to the benchmark sending rate of the network. A higher benchmark sending rate of the network indicates a better network environment in which frame dropping is less likely to occur. Therefore, in the established reference relationship, there may be more video frames that directly reference an IDR frame. In this way, whether to perform frame dropping is determined separately for the video frames that directly reference the IDR frame so that cases in which frame dropping occur are decentralized. Thereby, a total quantity of dropped frames is reduced, and video playing smoothness is improved.

Step 103: Detect a data occupation length of buffered video frames in a video sending buffer during a process of sending the video frame sequence.

The sending buffer is used to buffer several video frames that are about to be sent. The data occupation length of the sending buffer may reflect changes of the network environment in real time. In a general situation, when the network environment is relatively good, a video frame buffered in the sending buffer may be sent quickly. Therefore, the data occupation length of the sending buffer is relatively small. However, when the network environment is poor, video frames buffered in the buffer are likely to be detained, which causes an increase of the data occupation length of the sending buffer and even an overflow. Therefore, in a process of sending the video frame sequence, the data occupation length of the buffered video frames in the video sending buffer is detected in order to determine whether to store a current to-be-buffered video frame in the sending buffer, or drop the current to-be-buffered video frame.

Step 104: When the data occupation length is greater than a preset threshold, drop a current to-be-buffered video frame, and drop all video frames in the video frame sequence that reference the current to-be-buffered video frame according to the reference relationship.

When the data occupation length is greater than the preset threshold, it indicates that the buffered video frames in the sending buffer are detained or even overflow. Therefore, the current to-be-buffered frame is dropped. At the same time, all video frames that reference the current to-be-buffered frame are dropped together.

With the frame dropping method for a video frame provided in this embodiment of the present disclosure, according to a preset criterion, a reference relationship between video frames in a video frame sequence is established and whether to perform frame dropping is further determined. In a process of sending the video frame sequence, when frame dropping is determined to be performed, a current to-be-buffered video frame is dropped, and all video frames in the video frame sequence that reference the current to-be-buffered video frame according to the reference relationship are dropped, without a need to perform frame dropping until an IDR frame arrives. In this way, a quantity of dropped video frames in one frame dropping operation is reduced, long-time freezing of an image is avoided, and video playing smoothness is improved.

Based on the embodiment corresponding to FIG. 1, an embodiment of the present disclosure provides another frame dropping method for a video frame, and describes in detail a reference relationship between video frames in a video frame sequence and a specific frame dropping manner when the reference relationship is determined. Specific steps are as follows.

Step 201: Obtain a video frame sequence of a to-be-sent video.

The video frame sequence is a sequence including a given quantity of video frames. The video frame sequence may be a segment of an original video frame sequence. The original video frame sequence may include multiple video frame sequences. In this embodiment, the frame dropping method provided in the present disclosure is described with respect to a video frame sequence. During a process of sending the to-be-sent video, the frame dropping method may be cyclically applied to some or all video frame sequences included by the original video frame sequence.

Step 202: Establish a reference relationship between video frames in the video frame sequence according to a preset criterion.

The reference relationship includes that in the video frame sequence, the $m^{th}$ frame references the $(m-h)^{th}$ frame, that is, one video frame in the video frame sequence references a video frame that is in the video frame sequence and that is before the video frame, and that in the video frame sequence, the $n^{th}$ frame is referenced by at least two video frames of video frames after the $n^{th}$ frame, that is, one video in the video frame sequence may be simultaneously referenced by at least two video frames of video frames in the video frame sequence that are after the video frame, where m, h, and n are all natural numbers, m is greater than 1 and m is greater than h, and a quantity of the video frames in the video frame sequence is not less than n+2.

With reference to the embodiment corresponding to FIG. 1, establishing a reference relationship according to a preset criterion may be establishing the reference relationship between the video frames in the video frame sequence according to a requirement on video playing smoothness, according to different importance of the video frames in the video frame sequence, according to a benchmark sending rate of a network, or the like.

For easy and clear description of the technical solutions in the embodiments of the present disclosure. In this embodiment of the present disclosure, non-IDR video frames in the video frame sequence are categorized into base frames and extended frames, and the non-IDR video frames in the video frame sequence are classified into K frame groups. An IDR frame is the first frame of the video frame sequence, each frame group of the K frame groups is a segment including several consecutive video frames in the video frame sequence. A base frame is a video frame that directly references the IDR frame, and an extended frame is a video frame that indirectly references the IDR frame. Among the K frame groups, each frame group includes a base frame, and all video frames in each frame group except the base frame are extended frames. K is an integer greater than or equal to 1.

There may be a same quantity or different quantities of video frames included in different frame groups. The present disclosure imposes no limitation on specific quantities of video frames included in the different frame groups.

Figure 2B:
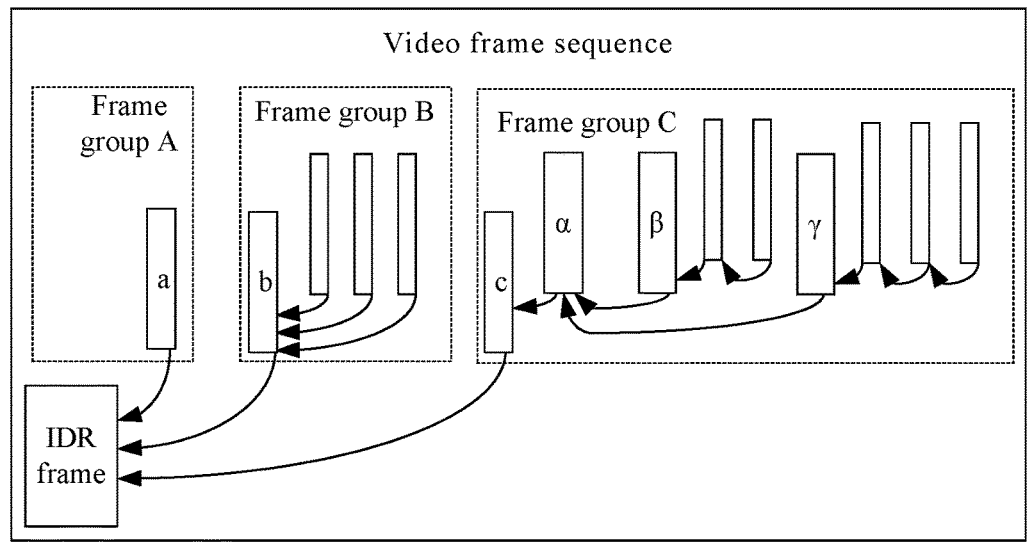
FIG. 2B is a schematic diagram of a reference relationship between video frames in a video frame sequence according to an embodiment of the present disclosure.

With reference to FIG. 2B, FIG. 2B is a schematic diagram of an example of a reference relationship between video frames in a frame group when a video frame sequence includes three frame groups, a frame group A, a frame group B, and a frame group C. A base frame a, a base frame b, and a base frame c all directly reference an IDR frame, and all may correspond to a case in which the $m^{th}$ frame references the $(m-h)^{th}$ frame in the video frame sequence. In addition, the IDR frame is referenced by the three video frames, the base frame a, the base frame b, and the base frame c. This may correspond to a case in which the $n^{th}$ frame is referenced by at least two video frames of video frames after the $n^{th}$ frame in the video frame sequence. The reference relationship shown in FIG. 2B includes multiple occasions in which a video frame references a video frame before the video frame, and in which one video frame is referenced by at least two video frames after the video frame. These occasions are not indicated one by one in the following descriptions.

For the $k^{th}$ frame group of the K frame groups, the frame group includes at least one video frame. The $k^{th}$ frame group includes one base frame, where k is an integer greater than or equal to 0 and less than or equal to K, that is, the $k^{th}$ frame group may be any one frame group of the K frame groups.

When the $k^{th}$ frame group includes only one video frame, the one video frame included by the $k^{th}$ frame group is a base frame. In FIG. 2B, the frame group A includes only one base frame, that is, the base frame a. With reference to the embodiment corresponding to FIG. 1, when the reference relationship between the video frames in the video frame sequence is established according to a requirement on video playing smoothness or according to a benchmark sending rate of a network, a higher requirement on video playing smoothness or a higher benchmark sending rate of the network indicates a larger quantity of video frames that directly reference the IDR frame. Optionally, video frames after the IDR frame all reference the IDR frame. That is, every frame group of the K frame groups includes only a base frame. In this case, for the $k^{th}$ frame group, when frame dropping is determined to be performed, only one video frame is dropped such that video playing smoothness is improved.

When the $k^{th}$ frame group includes at least two video frames, the $k^{th}$ frame group includes a base frame and an extended frame sequence. The base frame is the first frame of the $k^{th}$ frame group, and the extended frame sequence is a sequence including S video frames in the $k^{th}$ frame group that are other than the base frame. The frame group B in FIG. 2B includes the base frame b and an extended frame sequence. The extended frame sequence includes 3 extended frames. The video frames in the extended frame sequence all directly reference the base frame b, and the base frame b directly references the IDR frame. Thereby, every video frame in the extended frame sequence indirectly references the IDR frame.

The $s^{th}$ video frame in S video frames references any one video frame that is in the $k^{th}$ frame group and that is before the $s^{th}$ video frame, where S is an integer greater than or equal to 1, and s is an integer greater than or equal to 1 and less than or equal to S.

A specific reference relationship between video frames within the S video frames in the extended frame sequence is further described with reference to a specific frame dropping manner in the subsequent steps.

Step 203: Detect a data occupation length of buffered video frames in a video sending buffer during a process of sending the video frame sequence.

The sending buffer is used to buffer several video frames that are about to be sent. The data occupation length of the sending buffer may reflect changes of a network environment in real time. Therefore, in a process of sending the video frame sequence, the data occupation length of the buffered video frames in the video sending buffer is detected in order to determine whether to store a current to-bebuffered video frame in the sending buffer, or drop the current to-be-buffered video frame.

Step 204: When the data occupation length is greater than a preset threshold, drop a current to-be-buffered video frame, and drop all video frames in the video frame sequence that reference the current to-be-buffered video frame according to the reference relationship.

Different reference relationships correspond to different frame dropping manners. When a reference relationship is given, for different video frames, when frame dropping is determined to be performed, quantities of dropped video frames are different. Optionally, different video frames may each correspond to one preset threshold of the sending buffer. Preferably, each video frame in the video frame sequence corresponds to one preset threshold of the sending buffer. Preset thresholds corresponding to two video frames respectively may be the same or different.

For ease of description, in the subsequent description, a first preset threshold, a second preset threshold, and the like, are used to represent different preset thresholds corresponding to different video frames.

With reference to the reference relationship shown in FIG. 2B, when the IDR frame is the current to-be-buffered video frame, if the data occupation length of the sending buffer is greater than a preset threshold, all base frames in the video frame sequence are dropped. Further, an extended frame referencing a base frame indirectly references the IDR frame and therefore is dropped together. Consequently, if the IDR frame is dropped, the entire video frame sequence is dropped altogether at last.

The preset threshold corresponding to the IDR frame is a first preset threshold. Further, if the data occupation length of the sending buffer is not greater than the preset threshold, the current to-be-buffered video frame is stored in the sending buffer. That is, if the data occupation length of the sending buffer is not greater than the first preset threshold, the IDR frame does not need to be dropped, and the IDR frame is stored in the sending buffer.

When the IDR frame is the current to-be-buffered video frame, if frame dropping is determined to be performed, the entire video frame sequence needs to be dropped. Such case should be avoided as far as possible to avoid affecting video playing smoothness. For this, the first preset threshold should be as great as possible. Optionally, when the IDR frame is the current to-be-buffered video frame, as long as an unoccupied part of the sending buffer can accommodate the IDR frame, the IDR frame is not dropped in order to avoid dropping the entire video frame sequence as far as possible, thereby ensuring video playing smoothness.

For the $k^{th}$ frame group, the specific reference relationship between the video frames within the S video frames and a frame dropping manner for the specific reference relationship are described in detail with reference to FIG. 2B.

Optionally, the $s^{th}$ video frame among the S video frames references any one video frame that is in the $k^{th}$ frame group and that is before the $s^{th}$ video frame, that is, the $s^{th}$ video frame may reference the base frame of the $k^{th}$ frame group, or may reference any one video frame that is among the S video frames and that is before the $s^{th}$ video frame. For example, every video frame in the $k^{th}$ frame group reference previous adjacent video frames. That is, the first video frame among the S video frames references the base frame, the $(s+2)^{th}$ video frame among the S video frames references the $(s+1)^{th}$ video frame, the $(s+1)^{th}$ video frame references the $s^{th}$ video frame, where s is an integer greater than or equal to 1, that is, the $s^{th}$ video frame may be any one video frame among the S video frames, and s+2 is less than or equal to S.

Corresponding to the foregoing reference relationship, with reference to the case in which the IDR frame is dropped, when the base frame of the $k^{th}$ frame group is the current to-be-buffered video frame, if the base frame of the $k^{th}$ frame group is determined to be dropped, the $k^{th}$ frame group needs to be dropped. A value of the preset threshold is a second preset threshold.

If the data occupation length of the sending buffer is not greater than the preset threshold, the base frame of the $k^{th}$ frame group does not need to be dropped. Whether to perform frame dropping for the S video frames included in the extended frame sequence may be further determined.

When the $s^{th}$ video frame is determined to be dropped, the $s^{th}$ video frame and video frames that are among the S video frames and that are after the $s^{th}$ video frame are all dropped. The preset threshold corresponding to the $s^{th}$ video frame is a third preset threshold.

Preferably, the S video frames may all directly reference the base frame of the $k^{th}$ frame group. The frame group B in FIG. 2B corresponds to a case in which video frames in the extended frame sequence all reference the base frame b. When the base frame of the $k^{th}$ frame group is not dropped, the $s^{th}$ video frame is used as the current to-be-buffered video frame to determine whether to perform frame dropping. When the $s^{th}$ video frame is determined to be dropped, only the $s^{th}$ video frame needs to be dropped. Further, the $(s+1)^{th}$ video frame may be used as the current to-be-buffered video frame to continue determining whether to perform frame dropping, where s+1 is less than or equal to S.

Further, optionally, the $s^{th}$ video frame and at least one video frame of video frames that are after the $s^{th}$ video frame all reference the $(s-n)^{th}$ video frame among the S video frames, where n is a positive integer greater than or equal to 0 and less than s. With reference to FIG. 2B, in an extended frame sequence of the frame group C, there are two video frames that reference a same video frame. In FIG. 2B, a video frame β and a video frame γ both directly reference a video frame α. Further, any one video frame that is in the frame group C and that is after the video frame α may also be directly or indirectly referenced by several video frames among video frames that are after the any one video frame. This is not shown in the figure. Using this reference relationship, a quantity of video frames included in the extended frame sequence can be adjusted, and a quantity of video frames that have a reference relationship with a certain video frame can also be adjusted such that a quantity of dropped video frames in one frame dropping operation can be adjusted.

An example in which the $s^{th}$ video frame and the $(s+n)^{th}$ video frame both reference the $(s-n)^{th}$ video frame is used for description, where s+n is less than or equal to S. Optionally, in the S video frames, video frames between the $(s-n)^{th}$ video frame and the $s^{th}$ video frame all reference a previous adjacent video frame, and all video frames that in the S video frames and that are after the $(s+n)^{th}$ video frame reference a previous adjacent video frame. With reference to FIG. 2B, video frames between the video frame β and the video frame γ as well as all video frames that are after the video frame γ all reference a previous adjacent video frame.

Corresponding to the foregoing reference relationship, when the $(s-n)^{th}$ video frame is determined to be dropped, the $(s-n)^{th}$ video frame and the video frames between the $(s-n)^{th}$ video frame and the $s^{th}$ video frame are dropped. At the same time, the $s^{th}$ video frame and the video frames that are among the S video frames and that are after the $s^{th}$ video frame are dropped altogether.

Further, the video frames that are among the S video frames and that are after the $s^{th}$ video frame may all directly or indirectly reference the $s^{th}$ video frame. This is not further described herein.

Certainly, a person skilled in the art may understand that multiple other reference manners between the S video frames may be further obtained by combining or changing the foregoing several specific reference manners. Therefore, flexible reference manners between extended frame sequences may be established.

A change in the reference relationship causes a corresponding change in a quantity of video frames having a reference relationship with the current to-be-buffered video frame. When frame dropping is determined to be performed, a quantity of dropped video frames in one frame dropping operation changes accordingly. In addition, in a given network environment, a quantity of frame dropping operations may be adjusted by adjusting magnitudes of the first threshold, the second threshold, and the third threshold.

Further, when whether to perform frame dropping is determined with respect to the IDR frame, the first threshold needs to be as great as possible. When whether to perform frame dropping is determined with respect to a base frame, the second threshold may be less than the first threshold. A smaller second threshold is more likely to result in frame dropping. Similarly, the third threshold may be less than the second threshold. A smaller third threshold is more likely to result in frame dropping.

Optionally, a small-quantity multi-dropping frame dropping policy is implemented by adjusting the reference relationship and specific values of preset thresholds in order to avoid dropping a large quantity of consecutive video frames at once, thereby improving video playing smoothness. In addition, when a network environment is not good, a video sending device may decrease a frame rate for video sending by means of frame dropping. When one frame dropping operation is completed, if the network environment meets a requirement for not dropping a subsequent video frame, frame dropping is ended, and the frame rate for video sending is increased accordingly. That is, with the small-quantity multi-dropping frame dropping manner, the video sending apparatus may decrease or increase the frame rate for video sending according to a change of the network environment in a timely manner in order to improve video playing smoothness and improve user experience.

With the frame dropping method for a video frame provided in this embodiment of the present disclosure, according to a preset criterion, a reference relationship between video frames in a video frame sequence is established and whether to perform frame dropping is further determined. In a process of sending the video frame sequence, when frame dropping is determined to be performed, a current to-be-buffered video frame is dropped, and all video frames in the video frame sequence that reference the current to-be-buffered video frame according to the reference relationship are dropped, without a need to perform frame dropping until an IDR frame arrives. In this way, a quantity of dropped video frames in one frame dropping operation is reduced, and long-time freezing of an image is avoided. In addition, a small-quantity multi-dropping frame dropping manner can be achieved by adjusting the reference relationship flexibly such that the video sending apparatus can decrease or increase a frame rate for video sending according to a change of a network environment in a timely manner, thereby improving video playing smoothness and improving user experience.

Figure 3:
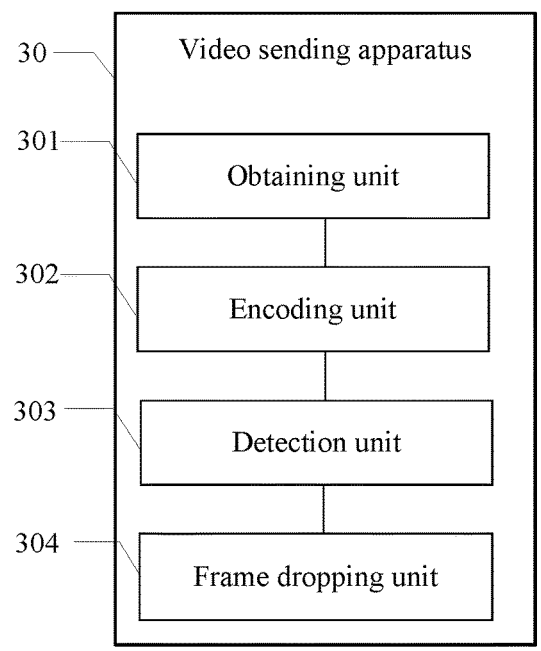
FIG. 3 is a schematic structural diagram of a video sending apparatus according to an embodiment of the present disclosure.

Based on the frame dropping method for a video frame provided in the present disclosure, an embodiment of the present disclosure provides a video sending apparatus 30 for executing the frame dropping method for a video frame provided in the present disclosure. Referring to FIG. 3, the video sending apparatus 30 includes an obtaining unit 301, an encoding unit 302, a detection unit 303, and a frame dropping unit 304.

The obtaining unit 301 is configured to obtain a video frame sequence of a to-be-sent video.

The encoding unit 302 is configured to establish, according to a preset criterion, a reference relationship, obtained by the obtaining unit 301, between video frames in the video frame sequence, where the reference relationship includes that in the video frame sequence, the $m^{th}$ frame references the $(m-h)^{th}$ frame, and that in the video frame sequence, the $n^{th}$ frame is referenced by at least two video frames of video frames after the $n^{th}$ frame, where m, h, and n are all natural numbers, m is greater than 1 and m is greater than h, and a quantity of the video frames in the video frame sequence is not less than n+2.

The detection unit 303 is configured to detect a data occupation length of buffered video frames in a video sending buffer during a process of sending the video frame sequence.

When the detection unit 303 detects that the data occupation length is greater than a preset threshold, the frame dropping unit 304 is configured to drop a current to-be-buffered video frame, and drop all video frames in the video frame sequence that reference the current to-be-buffered video frame according to the reference relationship.

Optionally, the preset criterion is a requirement on video playing smoothness.

The reference relationship, established by the encoding unit 302, between the video frames in the video frame sequence includes a higher requirement on video playing smoothness indicates a larger quantity of video frames that directly reference an IDR frame.

Optionally, the preset criterion is importance of each video frame in the video frame sequence.

The reference relationship, established by the encoding unit 302, between the video frames in the video frame sequence includes a video frame of greater importance is directly referenced by a video frame of less great importance.

Optionally, the preset criterion is a benchmark sending rate of a network.

The reference relationship, established by the encoding unit 302, between the video frames in the video frame sequence includes a higher benchmark sending rate of the network indicates a larger quantity of video frames that directly reference an IDR frame.

Optionally, the reference relationship between the video frames in the video frame sequence includes that video frames after the IDR frame all reference the IDR frame when the first frame of the video frame sequence is an IDR frame.

Optionally, each video frame in the video frame sequence corresponds to one preset threshold of the sending buffer.

Optionally, the frame dropping unit 304 is further configured to store the current to-be-buffered video frame in the sending buffer when the detection unit 303 detects that the data occupation length of the sending buffer is not greater than the preset threshold.

With the video sending apparatus 30 provided in this embodiment of the present disclosure, according to a preset criterion, a reference relationship between video frames in a video frame sequence is established and whether to perform frame dropping is further determined. In a process of sending the video frame sequence, when frame dropping is determined to be performed, a current to-be-buffered video frame is dropped, and all video frames in the video frame sequence that reference the current to-be-buffered video frame according to the reference relationship are dropped, without a need to perform frame dropping until an IDR frame arrives. In this way, a quantity of dropped video frames in one frame dropping operation is reduced, long-time freezing of an image is avoided, and video playing smoothness is improved.

Figure 4:
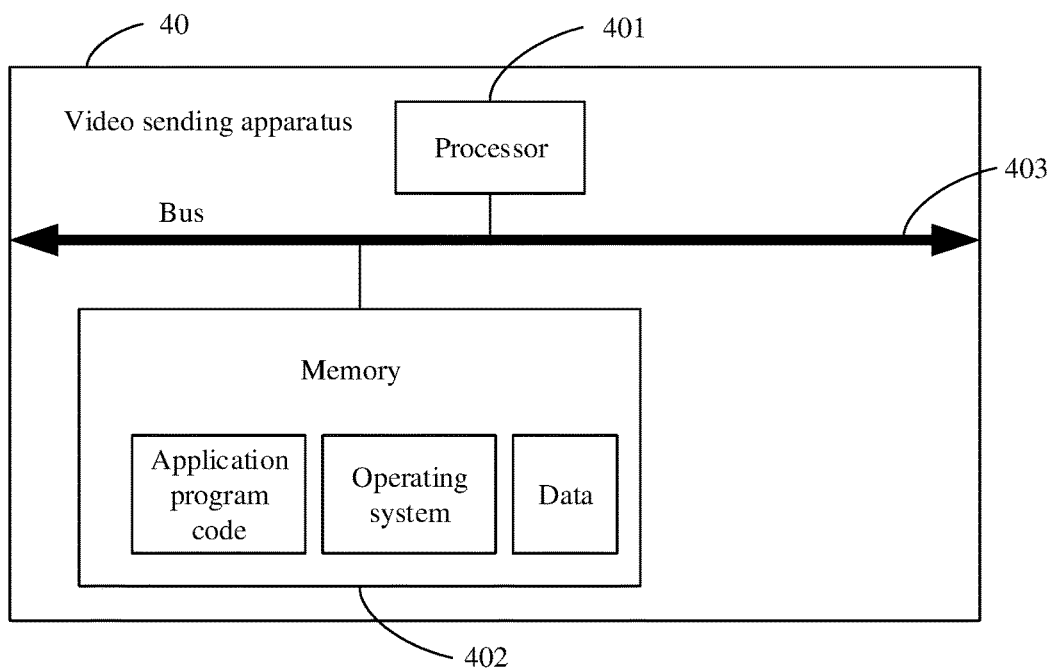
FIG. 4 is a schematic structural diagram of another video sending apparatus according to an embodiment of the present disclosure.

With reference to the embodiment corresponding to FIG. 3, an embodiment of the present disclosure provides a video sending apparatus 40. Referring to FIG. 4, the video sending apparatus 40 may be embedded in a microcomputer or be a microcomputer, for example, a portable device such as a general-purpose computer, a custom machine, a mobile terminal, or a tablet machine. The video sending apparatus 40 includes at least one processor 401, a memory 402, and a bus 403. The least one processor 401 and the memory 402 are connected and complete communication between each other using the bus 403.

The bus 403 may be an Industry Standard Architecture (ISA) bus, a peripheral component interconnect (PCI) bus, an Extended ISA (EISA) bus, or the like. The bus 403 may include an address bus, a data bus, a control bus, and the like. For ease of representation, the bus 403 is represented using only one bold line in FIG. 4, which, however, does not mean that there is only one bus or one type of bus.

The memory 402 is configured to store application program code of the solution of the present disclosure, where the application program code of the solution of the present disclosure is stored in the memory 402 and controlled and executed by the processor 401. The memory 402 further configured to store operating system and data.

The memory 402 may be but is not limited to a read-only memory (ROM) or another type of static storage device for storing static information and instructions, or a random access memory (RAM) or another type of dynamic storage device for storing information and instructions, or may be an electrically erasable programmable ROM (EEPROM), a compact disc ROM (CD-ROM) or another optical disk storage, an optical disc storage (including a compact disc (CD), a laser disc, an optical disc, digital versatile disc (DVD), a BLU-RAY DISC, and the like), a magnetic disk storage medium or another magnetic storage device, or any other computer-accessible medium that can be used to carry or store expected program code in an instruction or data structure form. These memories are connected to the processor 401 using the bus.

The processor 401 may be a central processing unit (CPU) or an application-specific integrated circuit (ASIC), or may be configured as one or more integrated circuits for implementing this embodiment of the present disclosure.

The processor 401 is configured to call the application program code in the memory 402 to execute the operations of the obtaining unit 301, the encoding unit 302, the detection unit 303, and the frame dropping unit 304 that are in the foregoing device embodiment corresponding to FIG. 3. The operations include obtaining a video frame sequence of a to-be-sent video, and establishing a reference relationship between video frames in the video frame sequence according to a preset criterion, where the reference relationship includes that in the video frame sequence, the $m^{th}$ frame references the $(m-h)^{th}$ frame, and that in the video frame sequence, the $n^{th}$ frame is referenced by at least two video frames of video frames after the $n^{th}$ frame, where m, h, and n are all natural numbers, m is greater than 1 and m is greater than h, and a quantity of the video frames in the video frame sequence is not less than n+2, detecting a data occupation length of buffered video frames in a video sending buffer during a process of sending the video frame sequence, and dropping a current to-be-buffered video frame, and dropping all video frames in the video frame sequence that reference the current to-be-buffered video frame according to the reference relationship when the data occupation length is greater than a preset threshold. For specific descriptions of the units, reference is made to the device embodiment corresponding to FIG. 3, which is not repeated herein.

With the video sending apparatus 40 provided in the embodiments of the present disclosure, according to a preset criterion, a reference relationship between video frames in a video frame sequence is established and whether to perform frame dropping is further determined. In a process of sending the video frame sequence, when frame dropping is determined to be performed, a current to-be-buffered video frame is dropped, and all video frames in the video frame sequence that reference the current to-be-buffered video frame according to the reference relationship are dropped, without a need to perform frame dropping until an IDR frame arrives. In this way, a quantity of dropped video frames in one frame dropping operation is reduced, long-time freezing of an image is avoided, and video playing smoothness is improved.

With descriptions of the foregoing embodiments, a person skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following is used as an example but is not limited. The computer readable medium may include a RAM, a ROM, an EEPROM, a CD-ROM or other optical disk storage, a disk storage medium or other disk storage, or any other medium that can be used to carry or store expected program code in a command or data structure form and can be accessed by a computer.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure is subject to the protection scope of the claims.

What is claimed is:

1. A frame dropping method for a video frame, comprising:
   obtaining a video frame sequence of a to-be-sent video;
   establishing a reference relationship between video frames in the video frame sequence according to a preset criterion, wherein the reference relationship comprises that in the video frame sequence, an $m^{th}$ frame references an $(m-h)^{th}$ frame, and an $n^{th}$ frame is referenced by at least two video frames of video frames after the $n^{th}$ frame, wherein m, h, and n are all natural numbers, wherein m is greater than 1 and h, and wherein a quantity of the video frames in the video frame sequence is not less than n+2;

detecting a data occupation length of buffered video frames in a video sending buffer during a process of sending the video frame sequence;

responsive to detecting that the data occupation length is greater than a first preset threshold, dropping a current to-be-buffered video frame and all video frames in the video frame sequence referencing the current to-be-buffered video frame according to the reference relationship;

responsive to detecting that the data occupation length is less than the first preset threshold, storing the current to-be-buffered video frame in the video sending buffer if the data occupation length is less than a second preset threshold, wherein the second preset threshold is less than the first preset threshold;

responsive to detecting that the data occupation length is less than the first preset threshold and greater than the second threshold;

storing the current to-be-buffered video frame if the current to-be-buffered video frame is an instantaneous decoding refresh (IDR) frame; and dropping the current to-be-buffered video frame if the current to-be-buffered video frame is a non-IDR frame.

2. The method according to claim 1, wherein the preset criterion is a requirement on video playing smoothness, wherein in the reference relationship, a higher requirement on the video playing smoothness indicates that a larger quantity of video frames directly reference an instantaneous decoding refresh (IDR) frame, and wherein the IDR frame is a first frame of the video frame sequence.

3. The method according to claim 1, wherein the preset criterion is importance of each video frame in the video frame sequence, and wherein in the reference relationship, a video frame of greater importance is directly referenced by a video frame of lesser importance.

4. The method according to claim 1, wherein the preset criterion is a benchmark sending rate of a network, wherein a higher benchmark sending rate of the network indicates a larger quantity of video frames in the reference relationship that directly reference an instantaneous decoding refresh (IDR) frame, and wherein the IDR frame is a first frame of the video frame sequence.

5. The method according to claim 1, wherein the reference relationship between the video frames in the video frame sequence further comprises that video frames after an instantaneous decoding refresh (IDR) frame all reference the IDR frame when a first frame of the video frame sequence is the IDR frame.

6. The method according to claim 1, further comprising determining whether an unoccupied portion of the video sending buffer is capable of storing the current to-be-buffered video frame if the current to-be-buffered video frame is an IDR frame when the data occupation length is greater than the first threshold.

7. The method according to claim 1, wherein the non-IDR frame is a P frame comprising less data than the IDR frame.

8. A video sending apparatus, comprising:
a memory comprising an application program code; and
a processor coupled to the memory, wherein the application program code causes the processor to be configured to:

obtain a video frame sequence of a to-be-sent video;

establish, according to a preset criterion, a reference relationship between video frames in the video frame sequence, wherein the reference relationship comprises that in the video frame sequence, an $m^{th}$ frame references an $(m-h)^{th}$ frame, and an $n^{th}$ frame is referenced by at least two video frames of video frames after the $n^{th}$ frame, wherein m, h, and n are all natural numbers, wherein m is greater than 1 and h, and wherein a quantity of the video frames in the video frame sequence is not less than n+2;

detect a data occupation length of buffered video frames in a video sending buffer during a process of sending the video frame sequence;

responsive to detecting that the data occupation length is greater than a first preset threshold, drop a current to-be-buffered video frame and all video frames in the video frame sequence that reference the current to-be-buffered video frame according to the reference relationship;

responsive to detecting that the data occupation length is less than the first preset threshold, store the current to-be-buffered video frame in the video sending buffer if the data occupation length is less than a second preset threshold, wherein the second preset threshold is less than the first preset threshold;

responsive to detecting that the data occupation length is less than the first preset threshold and greater than the second threshold;

storing the current to-be-buffered video frame if the current to-be-buffered video frame is an instantaneous decoding refresh (IDR) frame; and dropping the current to-be-buffered video frame if the current to-be-buffered video frame is a non-IDR frame.

9. The apparatus according to claim 8, wherein the preset criterion is a requirement on video playing smoothness, wherein the reference relationship between the video frames in the video frame sequence comprises that a higher requirement on the video playing smoothness indicates a larger quantity of video frames that directly reference an instantaneous decoding refresh (IDR) frame, and wherein the IDR frame is a first frame of the video frame sequence.

10. The apparatus according to claim 8, wherein the preset criterion is importance of each video frame in the video frame sequence, and wherein the reference relationship between the video frames in the video frame sequence comprises that a video frame of greater importance is directly referenced by a video frame of lesser importance.

11. The apparatus according to claim 8, wherein the preset criterion is a benchmark sending rate of a network, and wherein the reference relationship between the video frames in the video frame sequence comprises that a higher benchmark sending rate of the network indicates a larger quantity of video frames that directly reference an instantaneous decoding refresh (IDR) frame.

12. The apparatus according to claim 8, wherein the reference relationship between the video frames in the video frame sequence further comprises that video frames after an instantaneous decoding refresh (IDR) frame all reference the IDR frame when a first frame of the video frame sequence is the IDR frame.

13. The apparatus according to claim 8, wherein the processor is configured to determine whether an unoccupied portion of the video sending buffer is capable of storing the current to-be-buffered video frame if the current to-be-buffered video frame is an IDR frame when the data occupation length is greater than the first threshold.

14. The apparatus according to claim 8, wherein the non-IDR frame is a P frame comprising less data than the IDR frame.

15. A computer program product comprising a non-transitory computer readable storage medium storing program code thereon for frame dropping, the program code comprising instructions for executing a method that comprises:

obtaining a video frame sequence of a to-be-sent video;

establishing a reference relationship between video frames in the video frame sequence according to a preset criterion, wherein the reference relationship comprises that in the video frame sequence, an $m^{th}$ frame references an $(m-h)^{th}$ frame, and an $n^{th}$ frame is referenced by at least two video frames of video frames after the $n^{th}$ frame, wherein m, h, and n are all natural numbers, wherein m is greater than 1 and h, and wherein a quantity of the video frames in the video frame sequence is not less than n+2;

detecting a data occupation length of buffered video frames in a video sending buffer during a process of sending the video frame sequence; and responsive to detecting that the data occupation length is greater than a first preset threshold, dropping a current to-be-buffered video frame and all video frames in the video frame sequence referencing the current to-be-buffered video frame according to the reference relationship;

responsive to detecting that the data occupation length is less than the first preset threshold, storing the current to-be-buffered video frame in the video sending buffer if the data occupation length is less than a second preset threshold, wherein the second preset threshold is less than the first preset threshold;

responsive to detecting that the data occupation length is less than the first preset threshold and greater than the second threshold;

storing the current to-be-buffered video frame if the current to-be-buffered video frame is an instantaneous decoding refresh (IDR) frame; and dropping the current to-be-buffered video frame if the current to-be-buffered video frame is a non-IDR frame.

16. The computer program product according to claim 15, wherein the preset criterion is a requirement on video playing smoothness, wherein in the reference relationship, a higher requirement on the video playing smoothness indicates that a larger quantity of video frames directly reference an instantaneous decoding refresh (IDR) frame, and wherein the IDR frame is a first frame of the video frame sequence.

17. The computer program product according to claim 15, wherein the preset criterion is importance of each video frame in the video frame sequence, and wherein in the reference relationship, a video frame of greater importance is directly referenced by a video frame of lesser importance.

18. The computer program product according to claim 15, wherein the preset criterion is a benchmark sending rate of a network, wherein a higher benchmark sending rate of the network indicates a larger quantity of video frames in the reference relationship directly reference an instantaneous decoding refresh (IDR) frame, and wherein the IDR frame is a first frame of the video frame sequence.

19. The computer program product according to claim 15, wherein the reference relationship between the video frames in the video frame sequence further comprises that video frames after an instantaneous decoding refresh (IDR) frame all reference the IDR frame when a first frame of the video frame sequence is the IDR frame.

20. The computer program product according to claim 15, wherein the method further comprises determining whether an unoccupied portion of the video sending buffer is capable of storing the current to-be-buffered video frame if the current to-be-buffered video frame is an IDR frame when the data occupation length is greater than the first threshold.

* * * * *